United States Patent Office 3,565,608
Patented Feb. 23, 1971

3,565,608
RECOVERY OF GOLD FROM SOLUTIONS
Harry D. Anspon, Sewickley, Pa., and Donald G. Ashburn and Bert H. Clampitt, Overland Park, and Ronald E. Gilbert, Shawnee Mission, Kans., assignors to Gulf Research & Development Company, Pittsburgh, Pa., a corporation of Delaware
No Drawing. Filed Nov. 12, 1968, Ser. No. 775,148
Int. Cl. C22b 11/04
U.S. Cl. 75—118                                10 Claims

ABSTRACT OF THE DISCLOSURE

A method is provided in which gold is recovered from dilute aqueous solutions thereof by contacting such solutions with a water-insoluble ethylene polymer containing carboxylate and/or amide groups. The gold becomes associated with the carboxylate and/or amide groups of the polymer and can be recovered by burning the polymer to recover an ash enriched in gold.

BACKGROUND OF INVENTION

It has long been recognized that the world's seas constitute a veritable treasure trove of gold. It has been reliably reported that the German Government, immediately after World War I, assigned its famed chemist, Fritz Haber, to a research project to find an economical method of recovering gold from sea water to enable Germany to pay its reparations for World War I. Despite the efforts of many capable chemists, to date no practical method has been devised for recovering such gold, since it is always present in extremely dilute solutions. The cost of concentrating the gold salts has always been found to be excesive in relationship to the value of the gold solids that could be recovered. The practical problems of recovering gold have been further aggravated by the fact that the gold in sea water is usually found in association with other metal ions which complicate its recovery.

Accordingly, an object of the invention is to provide a process for the recovery of gold from aqueous systems containing gold.

Another object of the invention is to provide a process for the selective recovery of gold from dilute aqueous solutions containing gold such as sea water.

Other objects, advantages and features of the invention will be readily apparent to those skilled in the art from the following description and appended claims.

SUMMARY OF THE INVENTION

By the invention gold is selectively recovered from dilute aqueous solutions containing gold by contacting such solutions with a surface which is at least in part fabricated from a water-insoluble ethylene polymer containing pendant carboxylate and/or amide groups. The gold becomes associated with the ethylene polymer and is selectively extracted from the dilute aqueous solution. The gold can be recovered by burning the ethylene polymer to recover an ash enriched in gold.

DESCRIPTION OF THE INVENTION

The water-insoluble ethylene polymer containing pendant carboxylate and/or amide groups employed in the invention will, for convenience of expression, hereafter simply be referred to as the Ethylene Polymer. The Ethylene Polymer must be water-insoluble. For the purpose of this invention, a polymeric material will be considered to be water-insoluble, if less than one percent of the polymer will dissolve in distilled water at 25° C. The Ethylene Polymer will generally contain one mole of pendant carboxylate and/or amide groups, and preferably at least five moles of pendant carboxylate and/or amide groups per 100 moles of ethylene. Preferably, the Ethylene Polymer will contain at least 50 weight percent ethylene. Typical cations which may be included in the carboxylic salts are cations of Groups I, II and III of the Periodic Table of Elements such as alkali metal ions, e.g., sodium and potassium, alkaline earth metal ions, e.g., calcim, barium, and ions of Group III metals such as aluminum. In addition to pendant carboxylate and/or amide groups the Ethylene Polymer can contain pendant carboxylic acid and/or ester groups. Typical ester groups comprise the lower alkyl esters of carboxylic acids. The Ethylene Polymer employed in the invention can also be crosslinked.

In addition to the chemical specifications as described above, the Ethylene Polymer should have a physical strength sufficient to enable the Ethylene Polymer to be processed to provide the physical form desired for recovery of the gold. Specifically, the Ethylene Polymer should have a tensile strength of at least 500 p.s.i., a 100% modulus of at least 1000 p.s.i., and an elongation at break of at least 10 percent as measured by ASTM D 638–64T. Typical Ethylene Polymers that can be used in the practice of this invention and their method of manufacture will be described infra.

As the gold is extracted from an aqueous solution by means of a surface reaction, it is preferable to employ the Ethylene Polymer in a physical form having a high surface area per unit of weight. It is economically essential that the Ethylene Polymer be fabricated into a physical form having a surface area of at least 50 and preferably at least 1000 square centimeters per gram of polymer. The physical form in which the Ethylene Polymer is employed is not critical, provided only that it has the proper ratio of surface area per unit weight and adequate physical strength. Some physical forms found to be suitable include powders and fibers of the Ethylene Polymer. The emulsion form of the Ethylene Polymer can also be employed.

One physical form found to be particularly suitable for use in the practice of the present invention is the film form. Such film can be employed as a self-supporting film fabricated solely from the Ethylene Polymer. Alternatively, a laminated film may be employed in which the Ethylene Polymer is laminated onto the surface of another film such as polyethylene. In yet another embodiment of the invention, the Ethylene Polymer can be coated onto the surface of an article fabricated from another material such as metal. Preferably the support onto which the Ethylene Polymer is coated will have a high ratio of surface area per unit of weight. Metal screening is very suitable for this purpose.

As the gold is extracted from the aqueous solution by a surface reaction, it is desirable to conduct the process under conditions such that the gold containing water is maintained in constant movement with respect to the Ethylene Polymer surface. One means for achieving such a result is to move the Ethylene Polymer surface through the gold-containing water by attaching the article fabricated from the Ethylene Polymer to a moving ship. Another means to achieve this result is to attach the article fabricated from the Ethylene Polymer to buoys anchored in gold-containing water where currents and/or tides keep the water in constant movement.

After the article fabricated from the Ethylene Polymer has reacted with and sorbed a sufficient quantity of gold, the gold can be recovered therefrom in a number of ways. In some cases, the Ethylene Polymer can be simply burned to obtain an ash enriched in gold. In other cases, some forms of the Ethylene Polymer can be dissolved in a solution of caustic soda from which the gold can then be extracted by electrolysis or other known chemical processes.

While the process of the invention is designed primarily to recover gold from naturally occurring waters containing gold, the process also can be employed to recover gold from low grade ores which cannot be profitably processed by existing methods. In certain instances, such ores can be processed in situ in a satisfactory environment. In this embodiment of the invention, the low grade ore is contacted with chloride containing water, and ozone or another strong oxidizing agent is introduced into the water. This treatment dissolves a portion of the gold to form a dilute gold salt solution. This solution can then be treated as previously described to recover the gold therefrom. Dilute aqueous solutions of gold which occur incidentally to conventional gold processing can also be treated by the inventive process.

The Ethylene Polymer containing pendant carboxylate groups which is employed in the practice of the invention can be prepared by methods known in the art. For example, one of the better ways for manufacturing such an Ethylene Polymer is to saponify an ethylene-alkyl acrylate copolymer by the method disclosed in Canadian Patent 746,066. A polymer product is recovered containing pendant carboxylate groups and, optionally, pendant amide groups. Other copolymers which can be employed in preparation of the Ethylene Polymers of this invention include copolymers of ethylene and an ester of an acid of the group comprising maleic, fumaric and itaconic acids. The Ethylene Polymers containing pendant amide groups can be prepared by the process described in U.S. 3,337,517.

The following examples are set forth to illustrate more clearly the principle and practice of this invention to those skilled in the art.

EXAMPLE 1

A cast film is prepared from a hydrolyzed ethylene-methyl acrylate (20 weight percent methyl acrylate) copolymer. 50 percent of the pendant acrylate groups are converted to the sodium salt form; 35 percent of the pendant acrylate groups are converted to the amide form; 10 percent of the pendant acrylate groups are converted to the acid form; and 5 percent of the pendant acrylate groups remain in ester form.

The prepared Ethylene Polymer cast film is placed in an aqueous gold salt solution containing 12.5 p.p.m. of gold. After one month, the film is analyzed by neutron activation and found to contain about 700 p.p.m. of gold. This concentration of gold contained by the film corresponds to a removal of 80 weight percent of the gold originally present in the aqueous gold salt solution.

EXAMPLE 2

An aqueous gold salt solution containing 100 parts per billion gold is placed in bags fabricated from an ethylene-potassium acrylate (20 weight percent potassium acrylate) copolymer. The solutions are unstirred and are analyzed after a period of time of two weeks and after a period of time of five weeks. Results indicate that after two weeks, 38 weight percent of the gold is recovered from the solution and after five weeks, 61 weight percent of the gold is recovered from the aqueous salt solution.

EXAMPLE 3

The Ethylene Polymer film of Example 1 is placed in an aqueous solution containing gold, sodium, magnesium, calcium, potassium, strontium, aluminum, rubidium and barium cations, the eight most abundant cations found in sea water. The concentration of gold was 0.26 p.p.m. in the aqueous solution. The film was left in the aqueous solution for a period of 1 month.

Analysis of the film after 1 month by neutron activation indicates that the film contains 40 p.p.m. gold, corresponding to the recovery of substantially all of the gold from the solution.

EXAMPLE 4

A film fabricated from the Ethylene Polymer of Example 1 is placed in an aqueous solution containing 125 p.p.m. gold. After 2 weeks, the film is removed from the solution and burned to a residual ash. The ash residue is analyzed by neutron activation with the results indicating that the film contains 3,400 p.p.m. gold.

EXAMPLE 5

In this example bags fabricated from resins as shown below in Table I are filled with 500 ml. of an aqueous solution containing 50 milligrams of gold. In each of Runs 1, 2 and 3 the gold is permitted to be extracted out of the aqueous solution under static conditions. The aqueous solutions are examined after a period of two weeks and the gold content of the aqueous solution determine quantitatively with the results as indicated below in Table I.

TABLE I

| Run No. | Bag resin | Wt. percent of gold extracted from aqueous solution after 2 weeks |
|---|---|---|
| 1 | Polyethylene | 32 |
| 2 | Ethylene Polymer of Example 1 | 68.5 |
| 3 | Ethylene Polymer of Example 2 | 68 |

From the above it is readily apparent that the Ethylene Polymer resins of Examples 1 and 2 extract gold from the aqueous solution at an accelerated rate when compared to the extraction of gold effected by the polyethylene bag.

EXAMPLE 6

In this example plastic films (6.5 inches x 6.5 inches) as indicated below in Table II are placed in 12 liter containers in such a manner that they can be very slowly agitated. Containers are filled with synthetic sea water (aqueous solutions containing concentrations of cations found in sea water) containing 50 p.p.b. gold. After a period of one week, the 12 liter containers are emptied and new aqueous solution containing 50 p.p.b. gold are exposed to the prepared films. This procdure is repeated four times (new aqueous solutions are placed in contact with the films for five different periods).

After the final addition of the aqueous solution, the films are permitted to equilibrate for two weeks giving a total exposure time of the plastic films to the aqueous gold solution of six weeks. The films are then removed, washed with distilled water, dried and analyzed by a neutron activation analysis procedure. The results are shown below in Table II.

TABLE II

| Run No. | Composition of polymer films | Wt. of polymer film exposed to aqueous solution | Gold concentration in recovered film (p.p.m.) |
|---|---|---|---|
| 4 | Polyethylene | 0.904 | 226 |
| 5 | Ethylene Polymer in Example 1 | 0.424 | 903 |
| 6 | Ethylene-acrylamide (20 wt. percent acrylamide) | 0.405 | 500 |

From the above it is readily apparent that the ethylene-acrylamide copolymer film and the film of the Ethylene Polymer of Example 1 are highly effective in the recovery of gold from synthetic sea water.

Although the invention has been described with reference to specific materials, embodiments and details, various modifications and changes, within the scope of this invention, it will be apparent to one skilled in the art are contemplated and can be embraced in the invention.

We claim:

1. A process which comprises contacting an aqueous solution containing dissolved gold with a water-insoluble Ethylene Polymer containing pendant carboxylate salt and/or amide groups and recovering gold therefrom in association with said Ethylene Polymer.

2. The process of claim 1 wherein said Ethylene Polymer contains one mole of pendant carboxylate and/or amide groups per 100 moles of ethylene.

3. The process of claim 1 wherein said pendant groups comprises a carboxylate salt of an alkali metal.

4. The process of claim 1 wherein said Ethylene Polymer contains 5 moles of pendant carboxylate salt and/or amide groups per 100 moles of ethylene and wherein said ethylene comprises at least 50 weight percent of said Ethylene Polymer.

5. The process of claim 1 to include burning the gold containing polymer and recovering an ash rich in gold therefrom.

6. A process for recovering gold from dilute aqueous solutions thereof which comprises contacting said gold containing aqueous solution with an article of manufacture whose surface at least is in part fabricated from a pendant water-insoluble carboxylate salt and/or amine group containing Ethylene Polymer for a period of time sufficient to cause a portion of the gold thereof to become associated with said polymer, and removing said article of manufacture from said aqueous solution, said Ethylene Polymer being fabricated in a form having a surface area of at least about 50 square centimeters per gram, said Ethylene Polymer containing at least about 1 mole of carboxylate and/or amide groups for each 100 moles of ethylene in said polymer and containing at least 50 weight percent polymerized ethylene.

7. The process of claim 6 wherein the gold containing polymer is burned to recover an ash rich in gold.

8. The process of claim 6 wherein said pendant groups comprise salt groups of an interpolymer of ethylene and an ester of an acid of the group consisting of acrylic acid, methacrylic acid, maleic acid, itaconic acid and fumaric acid.

9. The process of claim 6 wherein the article of manufacture is a film of said polymer.

10. The process of claim 6 wherein the article of manufacture is fabricated from metal, has a high surface area to weight ratio and bears thereon a film of an Ethylene Polymer containing an alkali carboxylate salt and wherein the article of manufacture, after removal from the aqueous gold solution, is treated with hot aqueous alkali to recover the polymer and the gold from the article of manufacture.

References Cited

UNITED STATES PATENTS

| | | | |
|---|---|---|---|
| 3,006,756 | 10/1961 | Voker et al. | 75—118 |
| 3,033,675 | 5/1962 | Hedley | 75—118X |
| 3,088,798 | 5/1963 | Fetscher | 260—430X |
| 3,216,786 | 11/1965 | Corte et al. | 75—118X |
| 3,219,596 | 11/1965 | Hull et al. | 260—2.2 |
| 3,317,313 | 5/1967 | Buggs et al. | 75—118 |
| 3,337,517 | 8/1967 | Anspon | 260—86.7 |
| 3,444,143 | 5/1969 | Morris et al. | 260—2.2X |
| 3,473,921 | 10/1969 | Schmuckler | 75—118 |

FOREIGN PATENTS

| | | | |
|---|---|---|---|
| 746,066 | 11/1966 | Canada | 260—86.7 |

L. DEWAYNE RUTLEDGE, Primary Examiner

G. T. OZAKI, Assistant Examiner

U.S. Cl. X.R.

210—37, 38; 252—426; 260—2.1, 2.2